(12) United States Patent
Damask et al.

(10) Patent No.: US 6,393,039 B1
(45) Date of Patent: May 21, 2002

(54) DOUBLE-PASS POLARIZATION DIVERSIFIED BIREFRINGENT FILTER

(75) Inventors: Jay N. Damask, Annapolis, MD (US); Christopher Richard Doerr, Middletown Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/532,150

(22) Filed: Mar. 21, 2000

(51) Int. Cl.[7] .............................. H01S 3/10; H01S 3/08; G02B 27/28; G02B 27/10
(52) U.S. Cl. ......................... 372/27; 372/99; 372/100; 372/101; 372/105; 372/106; 359/498; 359/619
(58) Field of Search ........................... 372/27, 99, 100, 372/101, 105, 106; 359/498, 618

(56) References Cited

U.S. PATENT DOCUMENTS 4,987,567 A   1/1991   Buhrer

*Primary Examiner*—Frank G. Font
*Assistant Examiner*—Armando Rodriguez
(74) *Attorney, Agent, or Firm*—John A. Caccuro

(57) ABSTRACT

A double-pass birefringent filter apparatus comprises an external-interface apparatus (illustratively including of a beam-displacer element and a waveplate element); a birefringent filter comprised of a series of several birefringent waveplates; and a wrap-around unit (illustratively comprised of a beam-displacer element and a retro-reflector). In response to an input beam received at the external-interface apparatus, the double-pass birefringent filter forms two output beams having complimentary intensities which vary periodically with frequency.

16 Claims, 9 Drawing Sheets

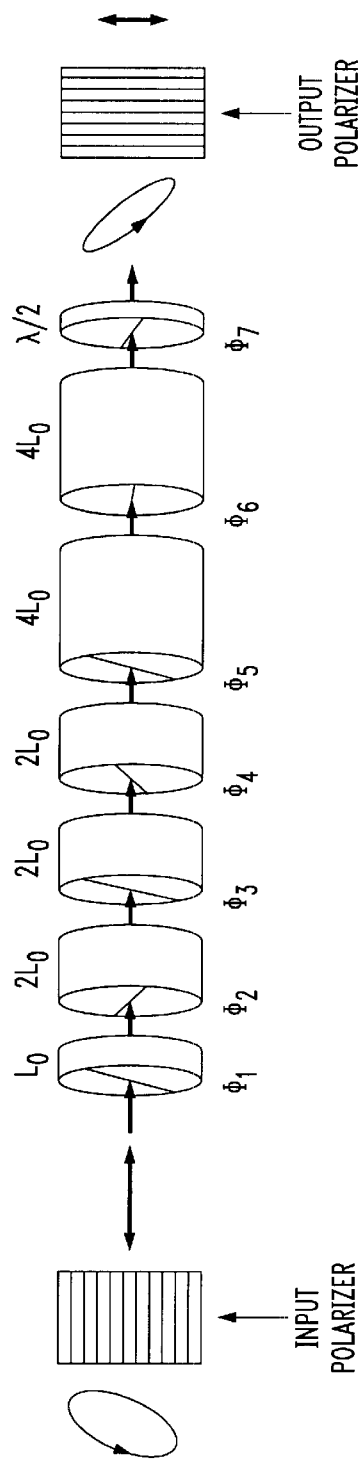
FIG. 1A
PRIOR ART
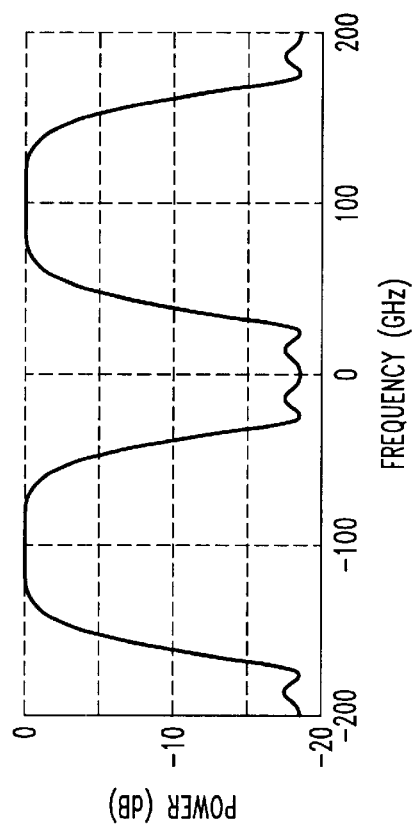

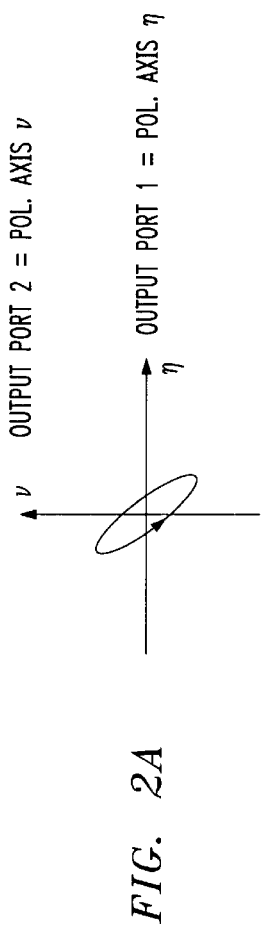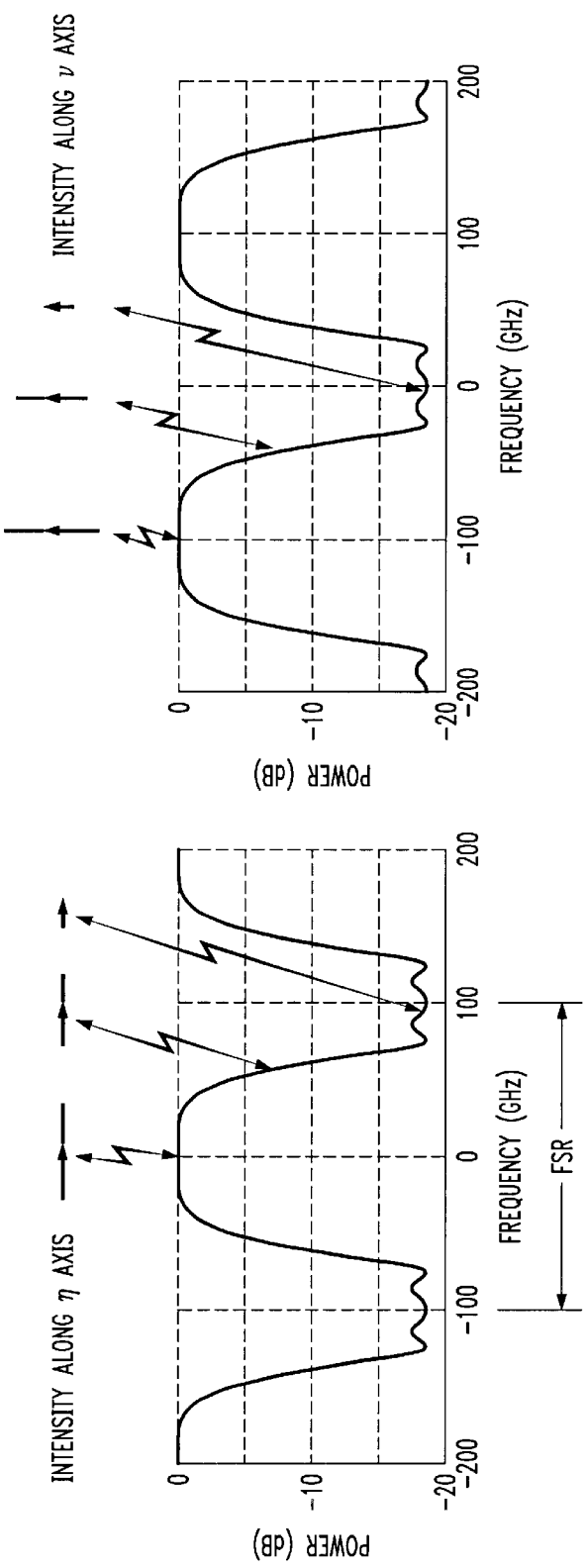
FIG. 2A
FIG. 2B

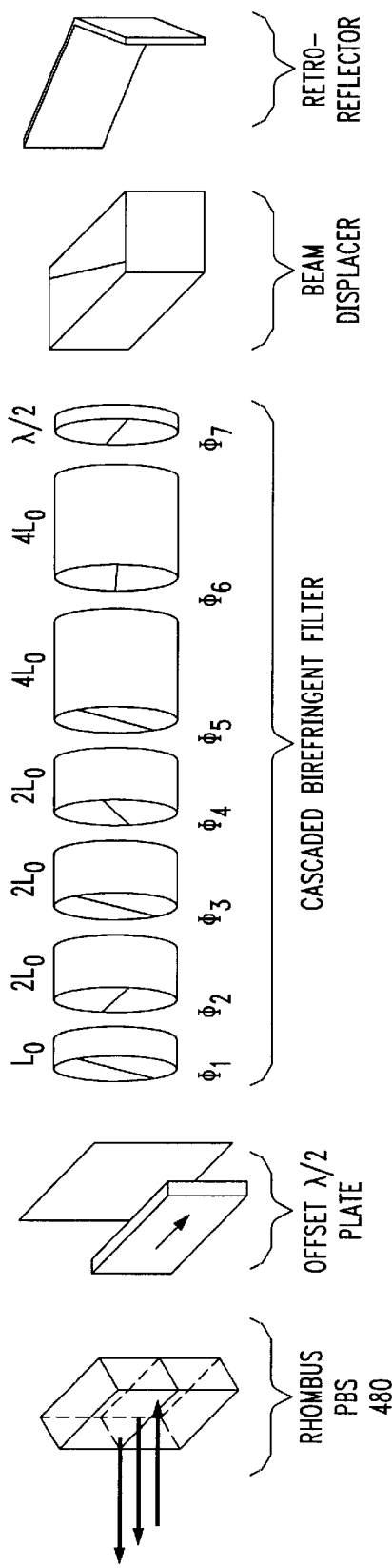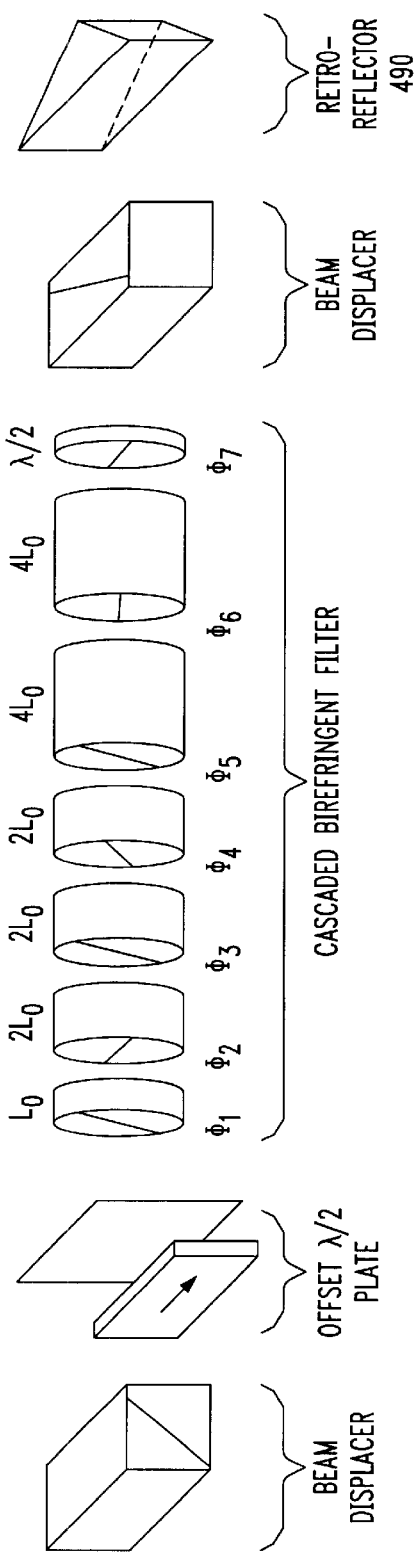

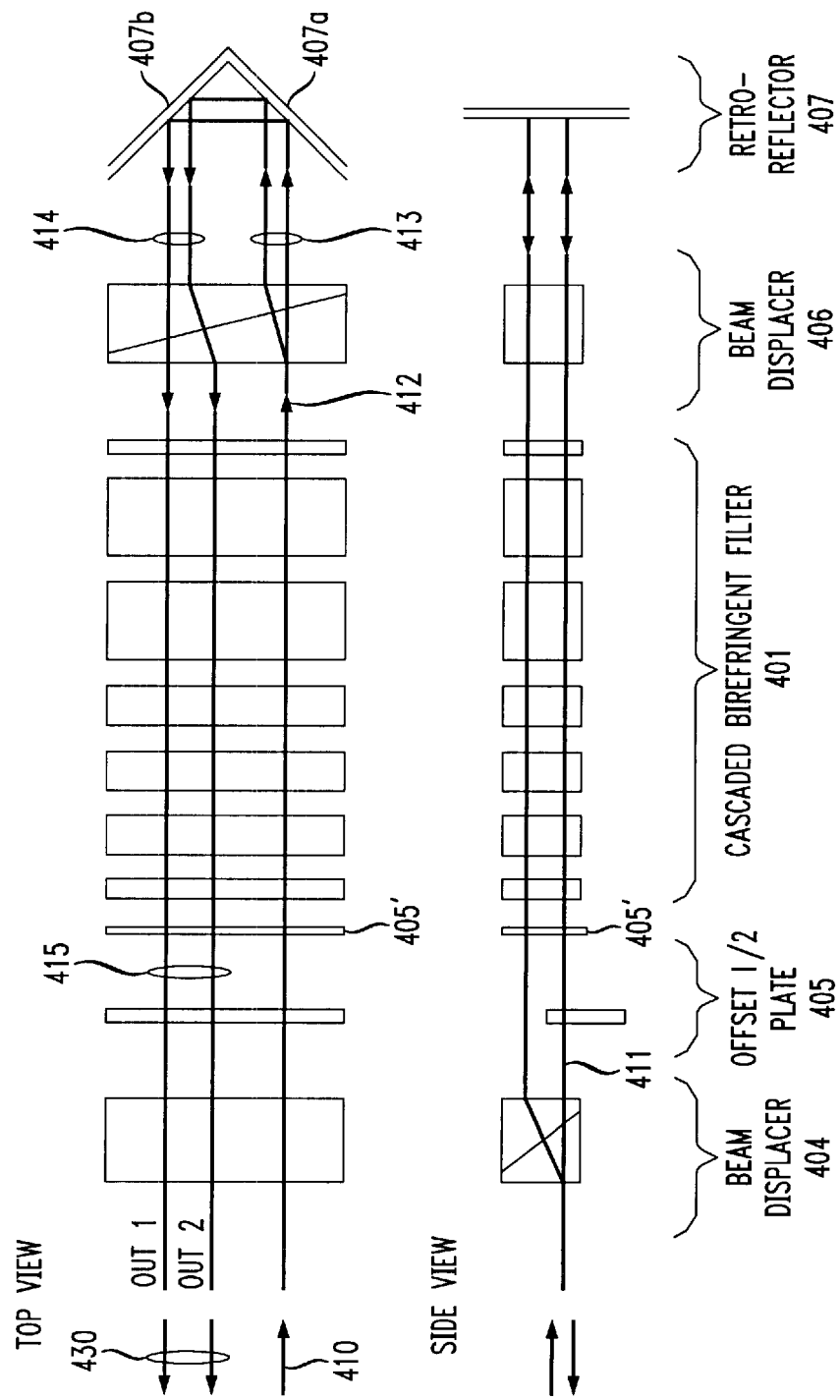

DOUBLE-PASS POLARIZATION DIVERSIFIED BIREFRINGENT FILTER

CROSS-REFERENCE TO RELATED APPLICATIONS

Related subject matter is disclosed the concurrently filed application entitled "POLARIZATION DIVERSITY FOR BIREFRINGENT FILTERS" by J. N. Damask and C. R. Doerr, which is assigned to the same Assignee.

FIELD OF THE INVENTION

The invention relates generally to birefringent filters and, more particularly, to a double-pass polarization diversified birefringent filter for separating even and odd channels of a wavelength division multiplexed signal.

BACKGROUND OF THE INVENTION

The birefringent filter was first developed by astronomers at the turn of the century so that they could make celestial observations of the Sun through a narrow-band spectral window. The classic papers on these filters were written by Loyt [1] Evans [2] and Solc [3]. (Note in this specification, a reference to another document is designated by a number in brackets to identify its location in a list of references found in the Appendix) In 1965 Harris et al [4] published a method of filter synthesis for the birefringent filter. In the late 1980s, Buhrer [5] brought the birefringent filter into the optical communications world with his demonstration of such a filter designed for optical wavelength multiplexing and demultiplexing.

The filters build by Lyot, Evans, and Solc, FIG. 1a used polarizers placed before and after the birefringent filter proper to isolate one polarization state at the input and then discriminate the state of polarization at the output of the filter. This was sufficient for their application because the Sun is an intense source and the polarization of light from the Sun is completely random.

In the late 1980s, Buhrer recognized that the use of input and output polarizers created excessive polarization-dependent loss and was therefore unsuitable for telecommunication applications. He instead created a method for polarization diversity. New input and output stages were proposed to allow the birefringent filter to handle simultaneously two orthogonal polarizations and to allow the output of the filter to couple to two complimentary ports. In his scheme, there is no loss of light, regardless of polarization. Buhrer U.S. Pat. No. 4,987,567 [6] further describes the use of a birefringent filter as an optical signal multiplexer/demultiplexer.

This invention makes two principal material improvements to the Buhrer scheme. First, improved input and output polarization diversity apparatuses to replace those invented by Buhrer are disclosed. Second, the architecture of the filter disclosed herein is folded in a compact manner to produce a simple double-pass filter. This is both separate and inventive on the Buhrer patent.

SUMMARY OF THE INVENTION

The double-pass birefringent filter disclosed herein offers a decreased polarization sensitivity and an increased crosstalk rejection over prior art designs and offers low insertion loss, high contrast, and low chromatic dispersion. Moreover, the double-pass design, in contrast to a single-pass design, offers improved filtering over prior art designs. A central application of the double-pass birefringent filter is for use as an interleaving filter to separate even and odd channels of a wavelength-division multiplexed optical signal.

In accordance with the present invention, a double-pass birefringent filter apparatus comprises an external-interface apparatus, itself illustratively comprised of a beam-displacer element and a waveplate element; a birefringent filter comprised of a series of several birefringent waveplates; and a wrap-around unit, itself illustratively comprised of a beam-displacer element and a retro-reflector. In response to an input beam received at the external-interface apparatus, the double-pass filter forms two output beams which exit the external-interface apparatus in a direction opposite that of the input. The output beam intensities vary in a complimentary manner so that their sum power remains invariant to the input frequency.

More particularly, our double-pass periodic birefringent filter comprises (1) an external-interface apparatus for receiving an input optical beam and producing therefrom parallel first and second polarized optical beams travelling in the forward direction offset in a first direction and having matching linear polarization states; (2) a birefringent filter apparatus for receiving the first and second polarized forward-going optical beams and producing therefrom first and second elliptically polarized optical beams, each including first and second orthogonal beam components, the beams having complimentary intensities which vary periodically, over a predefined free-spectral range, with the frequency of the input optical beam; (3) a wrap-around apparatus for further separating in a second direction first and second elliptically polarized beams into four beams all with linear polarization states, and for reversing the direction (hereafter referred to as the backward direction) of all four linearly polarized beams so as to transit again the birefringent filter apparatus; where the clear aperture of the filter plates of the birefringent filter apparatus is large enough to accommodate both the forward-going beams and the backward-going beams, (4) where the same birefringent filter apparatus produces from the backward-going beams four elliptically polarized optical beams, each including first and second orthogonal beam components; and (5) where the external-interface apparatus has large enough clear aperture so as to accommodate all four backward-going beams (in addition to the two forward-going beams), and produce therefrom six parallel optical beams, two of which possess, in general, the two complimentary orthogonal polarization components (these beams being collected), and four of which possess, in general, only one of the two complimentary orthogonal polarization components (these beams being rejected).

In the preferred embodiment, the external-interface apparatus includes a birefringent beam displacer and a λ/2 waveplate which is offset so as to intersect only one half of the forward- and backward-going beams; the birefringent filter apparatus includes one or more birefringent waveplates designed so that the thickness of the plates controls the free-spectral range of the filter and the relative azimuth orientation of the plate(s) controls the shape of the filter intensity response; the wrap-around apparatus includes a birefringent beam displacer rotated 90 degrees with respect to the birefringent beam displacer located in the external-interface apparatus about the axis of the forward-going optical beam(s), and a retro-reflector mirror. In other embodiments a rhombus polarizing beam splitter (PBS) may be substituted for the birefringent beam displacer and/or a right-angle prism may be substituted for the retro-reflector mirror.

BRIEF DESCRIPTION OF THE DRAWING

In the drawings

FIG. 1a shows a prior art illustration of a cascaded birefringent filter with input and output polarizers, as used by early astronomers;

FIG. 2a shows, for the cascaded birefringent filter of FIG. 1, the output polarization signal at two linear orthogonal axes, υ and η, in response to a linearly polarized input signal and FIG. 2b shows the relative intensity variation along the η and υ polarization axes with frequency;

FIG. 4b shows a substitution of a rhombus polarization beam-splitter (PBS) for the beam displacer of FIG. 4a; and FIG. 4c shows a substitution of a retro-reflector prism for the retro-reflector of FIG. 4a;

FIG. 5a shows a top and side view illustrating the effect on a single input beam as it traverses the double-pass birefringent slicer filter of FIG. 4a and FIG. 5b shows a stick diagram illustrating the beam component locations as they traverse the double-pass birefringent slicer filter of FIG. 4a; and FIG. 6 shows the slicing of a wavelength division multiplexed (WDM) signal by our double-pass birefringent slicer filter of FIG. 4a.

DETAILED DESCRIPTION

FIG. 1a is an illustration of the original type of cascaded birefringent filter. An input polarizing sheet linearly polarizes the incoming light. The cascade of birefringent crystals, cut and oriented as waveplates, rotates the state-of-polarization (SOP) as a function of frequency. The output polarizer, as drawn, discriminates the SOP power as projected on a vertical axis from that projected on the horizontal axis. In this manner, the intensity of the output light is modulated as a function of frequency. An illustrative Intensity versus Frequency response characteristic is also shown.

Figure 1B:
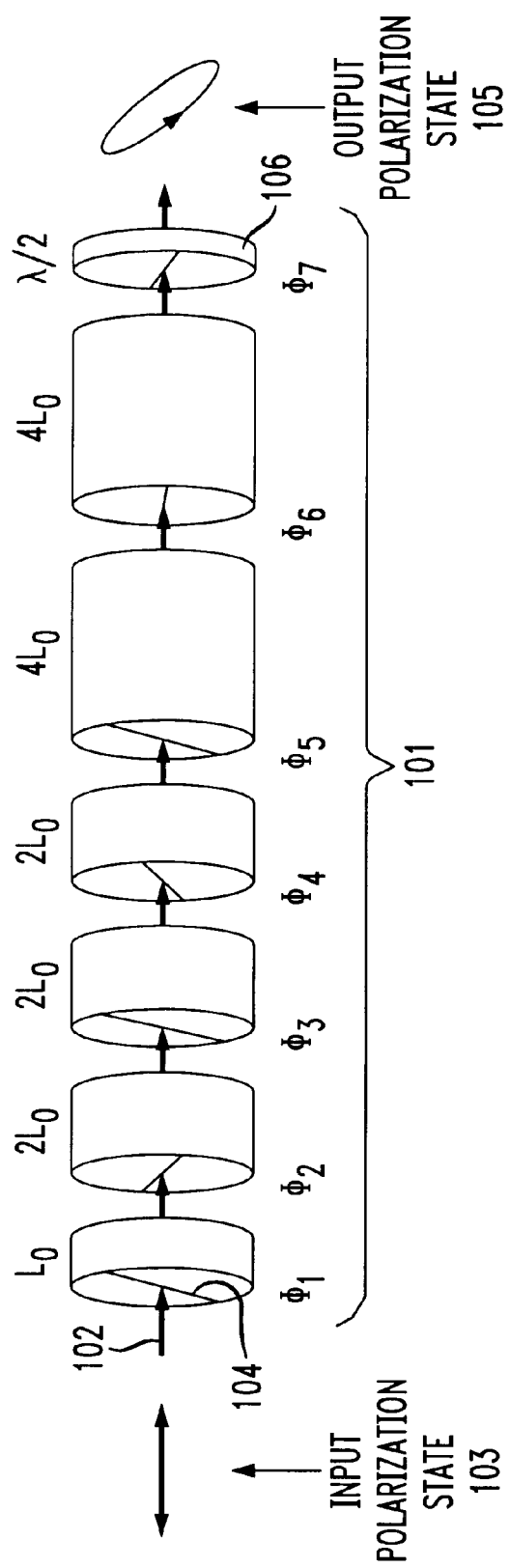
FIG. 1b shows a prior art illustration of a cascaded birefringent filter.

FIG. 1b is an illustration of the same original filter type but without the input and output polarizers. One or more plates of birefringent filter 101 cut and oriented as waveplates are placed one behind the other. Typical uniaxial birefringent materials are mica, calcite, rutile, yttrium orthovanadate, alpha-barium borate, and lithium niobate. The thickness of each plate, $L_0$–$4L_0$, is either a unit thickness or an integral-multiple of the unit thickness. Illustratively, for a 200 GHz free-spectral-range of the cascaded filter at 1.545 μm, the thinnest plate must be about 8.8 mm long if made with calcite.

A uniaxial birefringent crystal exhibits two natural indices of refraction oriented perpendicular to one another. One axis is called the fast axis while the other axis is called the slow axis, where fast and slow refer to the smaller and larger indices of refraction, respectively. The axes of the plates are oriented so that the plane that contains the fast and slow axes is perpendicular to the path 102 of the incident optical beam 103. In this orientation, the crystal acts as a waveplate. The azimuth rotation, e.g., 104, of each plate in 101 depends on the filter synthesis procedure as described in the prior art.

With a linearly polarized input signal 103, one or more uniaxial birefringent crystals produces, in general, an elliptical polarized output signal 105. An optional half-waveplate 106 at the end of the cascade rotates the filter output state-of-polarization (SOP) into the axis of the output stage (output stage not shown here).

FIG. 2a shows the projection of output state-of-polarization, 105 of FIG. 1, onto two linear orthogonal axes, υ and η. The frequency response of the filter manifests itself as the division of power between two linear orthogonal polarization axes, υ and η, which serve as the output "ports" of the birefringent filters of FIG. 1b.

As shown in FIG. 2b, the relative beam intensities along the υ axis and the η axes are indicated by the length of the arrows above the frequency response curves. The filter of FIG. 1 is periodic with a free-spectral-range (FSR) equal to the FSR of the thinnest plate, $L_0$ in FIG. 1. As shown, the intensity along the υ and η axes vary in a complimentary manner such that the sum of the two intensities at all frequencies remains constant. FIG. 2b illustrates one possible filter response, where over a first frequency band (centered at relative 0 GHz) the intensity on the η axis is near maximum and the intensity along the υ axis is near minimum, while over a second frequency band (centered at relative +/−100 GHz) the intensity on the η axis is near minimum and the intensity along the υ axis is near maximum. The intensity response is periodic with frequency and the shape of the response is the result of the filter plate orientations 101. While one plate gives a cosine-squared response, a cascade of plates can create a sharper filter characteristic.

A necessary step to make the birefringent filter of FIG. 1 suitable as an interleaving filter for optical telecommunications applications is to construct a means to spatially separate the optical output power on the two orthogonal polarization axes, υ and η, onto two distinct output ports.

Polarization Diversity of Prior Art

Figure 3A:
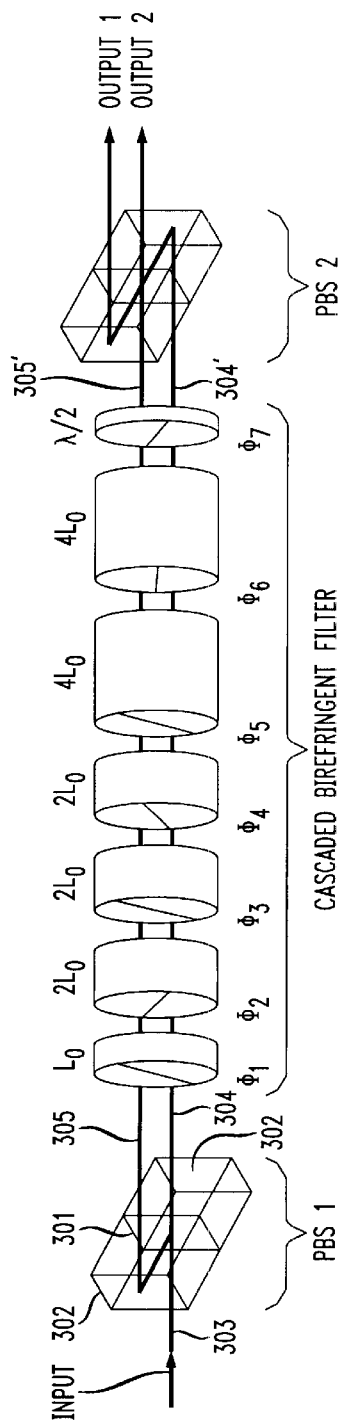
FIG. 3a shows an illustration of a prior art birefringent filter of U.S. Pat. No. 4,987,567

The extension of the classic birefringent filter illustrated in FIG. 1 to optical communication systems necessitates that the power on either output port be independent of the state-of-polarization at the input. Frequency alone must be the only discriminator. A means for polarization diversity is essential. In U.S. Pat. No. 4,987,567 [6] issued to Buhrer there is described a means for polarization diversity, where a polarization beam-splitter (PBS) and mirror combination placed at the input and output is employed, as shown in FIG. 3a. The input stage PBS 1 and output stage PBS 2 are made with a specially designed polarizing beam splitter (PBS). For this PBS, two 45-degree tilted rhombuses are used rather than the conventional two right triangles. The interface 301 uses a specially designed multi-layer dielectric film located between the rhombuses to split the input polarization in the same fashion as a PBS. The two rhombus faces 302 that are parallel to this interface 301 are mirror coated. In this way, the input beam 303 is aligned to the interface 301 and the interface separates the two polarizations. One polarization 304 continues through the interface 301 while the other polarization reflects towards the opposing mirror-coated rhombus face 302. The reflection from this mirror redirects the beam to run parallel 305 yet offset from the first beam 304. Together, this action achieves polarization separation by the creation of two parallel output beams 304 and 305.

Figure 3B:
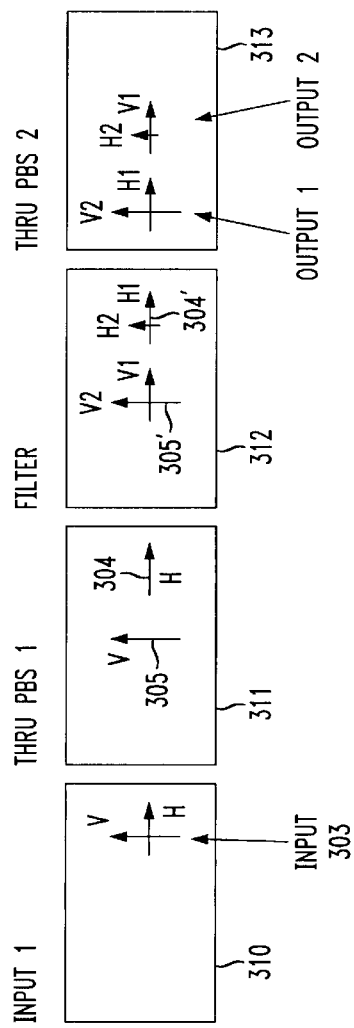
FIG. 3b shows a stick diagram illustrating the relative beam intensity along the η and υ polarization axes at various locations of the filter in response to an input signal.

FIG. 3b illustrates stick diagrams that indicate the polarization and spatial evolution as the beam 303 passes through the filter of FIG. 3a. At the input, beam 303 in general possesses two orthogonal polarization components, V and H in 310. The effect of PBS is to spatially separate V from H onto two distinct beams 304 and 305, frame 311. In general, transmission through the cascaded birefringent filter transforms the linear polarization states V and H to elliptical states, depending on the optical frequency of the light. Frame 312 illustrates the output of the cascaded birefringent filter with polarization components V1 and V2 on beam 305', and polarization components H1 and H2 on beam 304'. V1 and H1 represent the horizontal η polarization components, and V2 and H2 represent the vertical ν polarization components. While V1 is horizontal and H2 is vertical, the use of the notation 'V1' and 'H2' is to indicate the origin of these components rather than their absolute SOP with respect to the input.

While PBS 1 separated the two incoming polarization states onto two distinct beams, PBS 2 must combine the appropriate polarization components from beams 304' and 305' to form two complimentary output ports, Output 1 and Output 2, frame 313. PBS 2 is positioned so that beam 305' intersects the interface 301 on PBS 2 while beam 304' reflects from the mirror coated surface 302 on PBS 2. PBS 2 then combines polarization components V2 and H1 onto Output 1, and combines polarization components V1 and H2 onto Output 2. With the apparatus described, the desired performance is achieved, where the output beam intensity is a function only of the input optical frequency and not the state of polarization.

Prior Art Problems and Improvements

The Buhrer method appears to have a satisfactory performance; yet the imperfections present in the PBS components result in both a low contrast ratio between polarization states and polarization-dependent loss (PDL). Accordingly, the practical implementation suffers from crosstalk and PDL impairments.

In accordance with the present invention, we describe an alternative polarization-diversified birefringent filter, shown in FIG. 4. Our method of polarization diversity can provide an order-of-magnitude improvement in the contrast of polarization separation over that provided by the PBS input and output stages used by Buhrer, and a reduction in PDL. The PBS stages typically yield only 27 dB contrast between the two output orthogonal linear polarizations. The 27 dB contrast of the PBS stages occurs because of the limited ability to fabricate a dielectric stack at the PBS interface 301 which is sufficiently polarization sensitive, achromatic, and low loss. Moreover, typically the transmission and reflection of the two orthogonal polarization states at the dielectric interface 301 is asymmetric. An example with currently available PBS components is a transmission of ~95% and a reflection of ~99%. Such asymmetry produces PDL.

Double Pass Filter Design

In accordance with the present invention, we describe an alternative polarization-diversified birefringent filter, shown in FIG. 4. Our method of polarization diversity can provide an order-of-magnitude improvement in the contrast of polarization separation over that provided by the PBS input and output stages used by Buhrer, and a reduction in PDL. Moreover, we disclose a simple and compact double-pass architecture which both inherits the polarization-diversity improvements presented herein and exhibits superior filter performance in applications where especially low crosstalk levels are imperative.

Double-Pass Filter Design

Figure 4A:
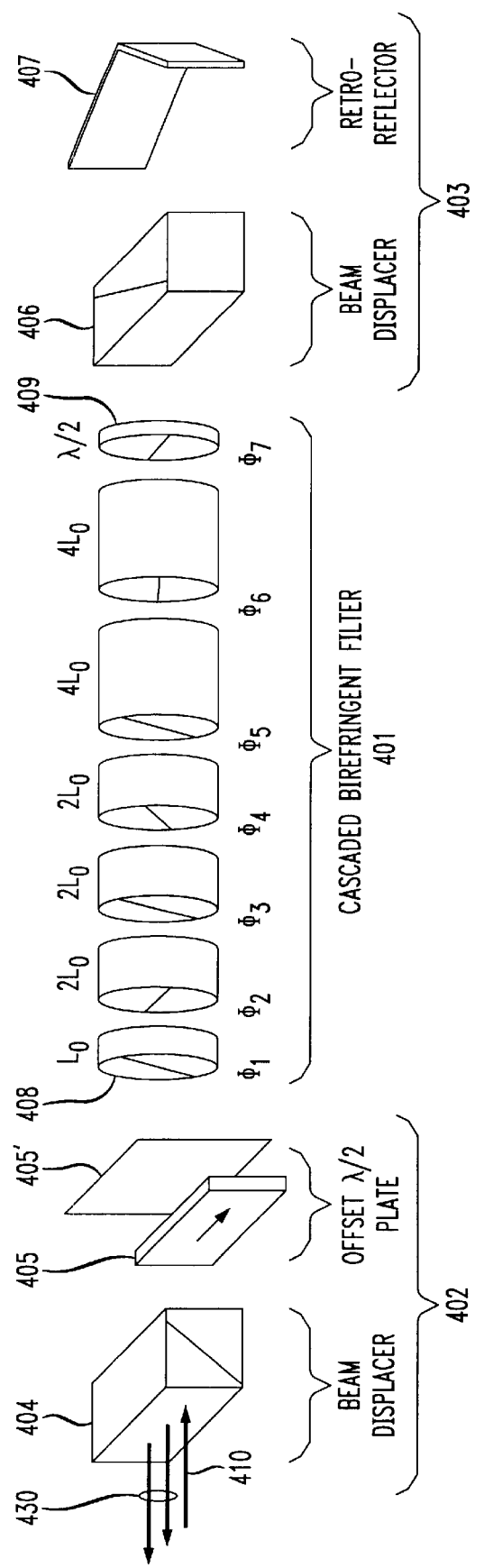
FIG. 4a shows our inventive implementation of a double-pass periodic birefringent slicer filter.

FIG. 4a illustrates our double-pass filter design as used in a polarization-insensitive 1-port to 2-port configuration. The figure uses the same birefringent filter 401 as in FIG. 3a, but replaces the input and output PBS elements with our external-interface and wrap-around stages. Different also is that light beams in the double-pass filter travel through the birefringent filter 401 in both forward and backward directions while the light beams in the Buhrer filter travel in one direction only.

The external-interface stage 402 includes a first birefringent beam displacer 404 and a monolithic λ/2 waveplate 405. The monolithic λ/2 waveplate 405 is offset so as to intersect only three of the six forward and backward traveling beams. The birefringent filter 401 includes one or more birefringent elements 408 cut and oriented as waveplates. The extraordinary axis of these elements is cut to lie on the crystal face perpendicular to the light beam path. Each element is then rotated about its normal to a pre-calculated angle which is determined by a filter synthesis algorithm. An optional λ/2 waveplate 409 follows all birefringent waveplates 408 so as to align the coordinate system of the birefringent filter 401 with the wrap-around stage 403. The wrap-around stage 403 includes a first birefringent beam displacer 406 and a retro-reflector 407. The direction of displacement of beam displacer 406 is perpendicular to the displacement direction of beam displacer 404. The retro-reflector is a compound mirror, where two mirrors are located to face each other at a 90 degree angle. The forward-going light beams are thus offset and reflected to backward-going light beams.

FIG. 4b shows another embodiment of FIG. 4a where a rhombus polarization beam-splitter (PBS) 480 is substituted for the beam displacer 404. FIG. 4c shows another embodiment where a retro-reflector prism 490 is substituted for the retro-reflector 407 of FIG. 4a.

Figure 5B:
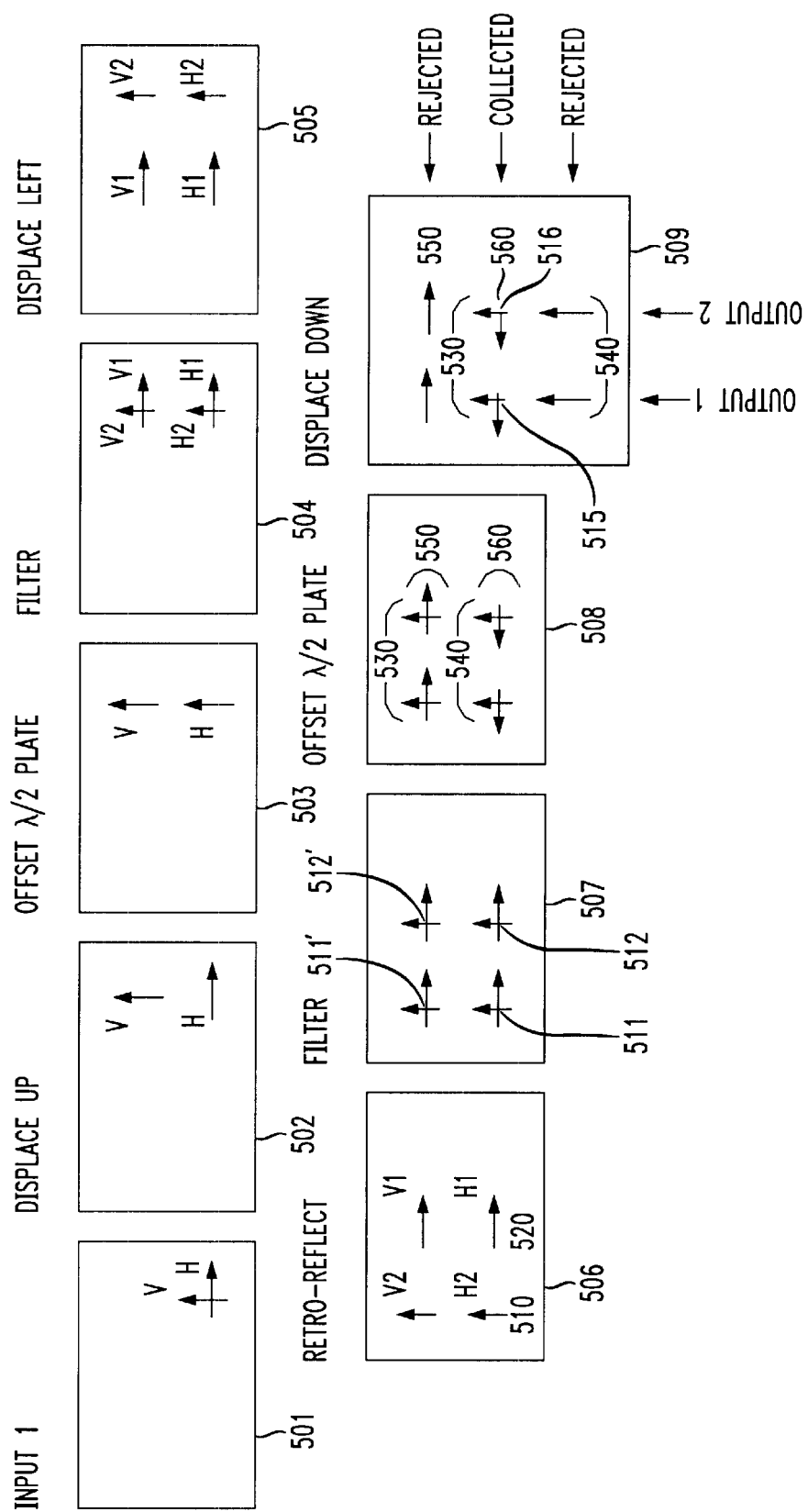

FIG. 5a shows the path of the light beams through the double-pass filter and FIG. 5b shows stick diagrams that indicate the polarization and spatial evolution of the light beams during transit of the filter. The input light beam 410 is in general elliptically polarized. Frame 501 of FIG. 5b indicates the presence of both horizontal and vertical polarization components on the input beam 410. Beam displacer 404 spatially separates the horizontal and vertical polarization components, frame 502. The direction of the displacement is "up". The two separated forward-going components travel in parallel. The lower of the two beams, 411 [note this number 411 is not a unique designation of the lower of the two forward-going beams since 411 also applies to the backward-going beams], subsequently transits an offset, monolithic λ/2 waveplate 405. The λ/2 waveplate 405 rotates the state of polarization on beam 411 by 90 degrees, frame 503. Now both beams travel in parallel and have the same polarization state.

The offset, parallel, and same-polarization beams output from the external-interface stage 402 transit the birefringent filter 401. In general, the birefringent filter 401 transforms linear polarization states into elliptical polarization states, having both horizontal and vertical components, frame 504. The transformation from linear to elliptical polarization is a function of the frequency of the input light beam 410 and the filter design.

The two orthogonal polarization components on the two beams which emerge from birefringent filter 401 are spatially separated by beam displacer 406, frame 505. The direction of displacement is such that four beams 413 emerge from displacer 406 in the form of four points on the corners of a rectangle. Each emergent beam is linearly polarized. All four beams reflect first from mirror surface 407a on the retro-reflector 407, altering their direction by 90 degrees. All four beams second reflect from mirror surface 407b on the retro-reflector 407, altering again their direction 90 degrees. The emergent beams are now "folded" back such that their direction is in opposition to the direction of transit prior to reflection. These four beams 414 now travel in the backward direction. Moreover, the relative positions of the four beams are altered by the retro-reflector, frame 506. The position of one pair of beams which are located one above the other 510 is exchanged with the position of the second pair of beams which are located one above the other 520, and all four beam positions are translated with respect to beams 413. All four parallel, linearly polarized, and co-propagating beams 414 next transit again beam displacer 406, doubling the separation between beam pairs 510 and 520.

Beams 414, after transit of beam displacer 406, enter again birefringent filter 401. Similar to the forward transit of the filter, to frame 504 from frame 503, each linearly polarized beam is in general transformed to an elliptically polarized beam, each beam possessing both horizontal and vertical polarization components, frame 507. The transformation from linear to elliptical polarization is a function of the frequency of the optical beam at the input, 410, and the design of the birefringent filter 401. The beams emergent 415 from birefringent filter 401 finally transit the external-interface apparatus 402.

The purpose of the external-interface apparatus 402 for the backward-going beams is to construct two output beams, which will be collected, that have polarization components which have been filtered twice. There will remain four beams which are rejected. The existence, in general, of power in the rejected light beams coincides with that light which is rejected by the birefringent filter 401 upon the second transit. The power in the rejected beams may be collected for some auxiliary purpose.

To form the two collected output beams 430, the lower two beams of 415, beams 511 and 512 from frame 507, first transit the offset $\lambda/2$ waveplate 405. Both polarization components of beams 511 and 512 emerge rotated 90 degrees, frame 508. Next all four beams transit beam displacer 404, which is oriented, as before, such that one polarization component is displaced downwards while the other is unaltered in location. In this way, vertical polarization components 530 of the two beams 550 are displaced downwards; vertical polarization components 540 of the two beams 560 are displaced downwards; and the remaining horizontal polarization components are unaffected. The result, frame 509, is six beams which are backward-going and parallel. The center two beams, 515 and 516, are collected as the output of the filter. While the remaining beams, 550 and 540, are shown as rejected, they may be utilized for signal monitoring or other purposes.

Imperfection of the offset $\lambda/2$ waveplate 405 may be corrected by the additional of a sheet polarizer 405', which is located following $\lambda/2$ waveplate 405 and preceding birefringent filter 401 and which polarizes all 6 beams. The sheet polarizer 405' is aligned to transmit vertical polarization components and reject horizontal polarization components, or vice versa, depending on the design.

As previously discussed, FIG. 2*b* illustrated the frequency-dependent polarization response of a birefringent filter 401, given a linearly polarized input beam. External interface 402 translates the frequency-dependent polarization response into amplitude response at outputs OUT1 and OUT2. Consider at relative frequency 0 GHz in FIG. 2*b* where the filter 401 output is strongly horizontal and weakly vertical. Accordingly, components V1 and H1 in beams 412 illustrated in frame 504 are strong while components V2 and H2 are weak. Following wrap-around with resulting displacement, beams 510 in frame 506 are weak while beams 520 in frame 506 are strong. Second transit through birefringent filter 401, in the backward-going direction, produces elliptically polarized beams, frame 507, where the horizontal components are relatively strong while the vertical components are relatively weak. Moreover, the sum power in beams 511 and 511' are relatively weak compared with the sum power in beams 512 and 512'. Subsequent processing by external-interface stage 402 results in collected beam 516 intensity to be strong relative to collected beam 515 intensity. As a result, OUT1 is accordingly intense and OUT2 is dim. At a different relative frequency, +/−100 GHz in FIG. 2*b*, the filter 401 output is strongly vertical and weakly horizontal. Following the same analysis as above, the double pass birefringent filter produces an intense OUT2 and dim OUT1. The sum of the powers on output ports OUT1 and OUT2 are always constant, conserving power at all frequencies. The relatively intensity between OUT1 and OUT2 varies periodically with frequency but is independent of input polarization in beam 410. The period of variation is the free-spectral range (FSR) of the birefringent filter 401.

Provided an appropriate birefringent filter 401 design, the whole of the invention presented in FIGS. 4*a*, 4*b*, and 4*c* can be used as an interleaving filter. Consequently, with reference to FIG. 6, if the input signal is a wavelength division multiplexed (WDM) signal having uniformly spaced channels in frequency with period FSR, the birefringent filter (BF) apparatus 501 (FIGS. 4*a*, 4*b*, and 4*c*) would de-interleave the WDM input signal so that the odd numbered channels would be outputted at OUT1 and the even numbered channels would be outputted at OUT2.

One application of our double-pass birefringent filter of FIGS. 4*a*–4*c* is in increasing the number of WDM channels that can be processed in optical demultiplexers and demultiplexers which utilize Arrayed-Waveguide Routers (AWG). For a given AWG frequency resolution capability, the frequency spacing of WDM channels presented to an AWG based multiplexer and/or demultiplexer can be doubled if the channels are first filtered by our birefringent filter to separate even and odd WDM channels which are then processed by separate AWGs.

Figure 6:
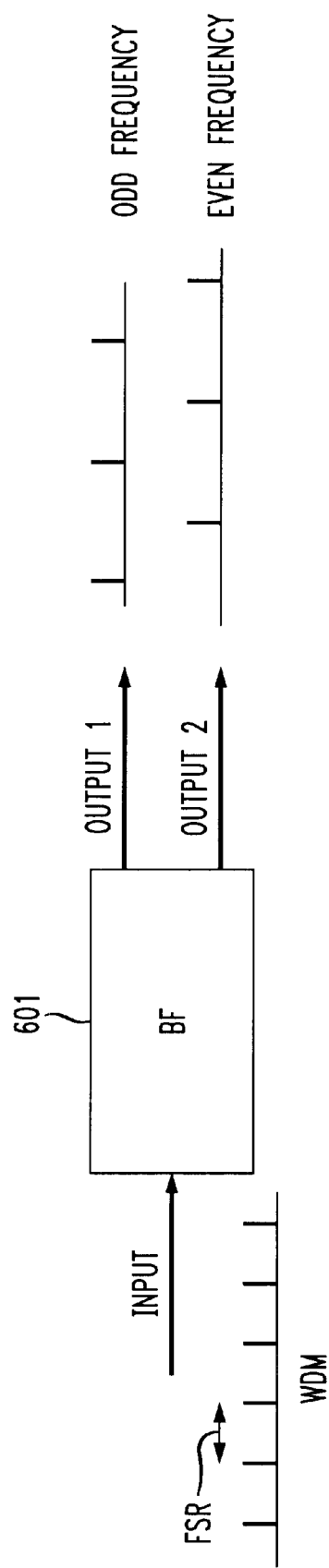

Such an arrangement is shown in FIG. 6. With reference to FIG. 6, if the input signal is a wavelength division multiplexed (WDM) signal having wavelengths with a FSR separation, the double-pass birefringent filter (BF) 601 would slice the WDM signal so that the odd numbered wavelengths would be outputted at OUT1 and the even wavelengths at OUT2. A separate AWG connected to each of OUT1 and OUT 2 (not shown) would then be used to further select one or more of the even and odd wavelengths.

Results

Our double-pass birefringent filter exhibits a particularly good response. The filter loss can be low, lower than 0.1 dB per stage. With sufficient filter synthesis and number of stages, a sharp, flat filter response is achievable. The phase response is excellent compared with Fabry-Perot or Fiber Bragg Grating filters because the impulse response is of finite and short duration.

When our double-pass birefringent filter is used in optical communication applications, polarization insensitive should be optimized. In doing so, a crosstalk floor should not be added if possible. Buhrer demonstrated the use of two special PBS stages, one each for input and output, to create a polarization insensitive filter. The crosstalk floor for good PBS elements are currently about −27 dB. These stages are relatively achromatic.

In contrast, our double-pass birefringent slicer filter can reduce the crosstalk floor to −40 dB from −27 dB and should be inherently achromatic. In addition, the double-pass input and output stage scheme presented herein exhibits tolerance to imperfection of the requisite $\lambda/2$ plates.

What has been described is merely illustrative of the application of the principles of the present invention. Other methods and arrangements can be implemented by those skilled in the art without departing from the spirit and scope of the present invention.

APPENDIX

References
[1] B. Loyt, Comptes Rendus vol. 197, pp. 1593, 1933.
[2] J. Evans, J. Opt. Soc. Amer., vol. 39, no. 3, pp. 229, 1949.
[3] I. Solc, Czech. J. Phys. vol. 3, pp. 366, 1953.
[4] S. Harris, J. Opt. Soc. Amer., vol. 54, no. 10, pp. 1267, 1964.
[5] C. Buhrer, Applied Optics, vol. 26, no. 17, pp. 3628, 1987; Applied Optics, vol. 27, no. 15, pp. 3166, 1988; Applied Optics, vol. 33, no. 12, pp. 2249, 1994.
[6] U.S. Pat. No. 4,987,567, issued to C. Buhrer on Jan. 22, 1991.

What is claimed is:

1. A double-pass birefringent filter comprising
    an external-interface apparatus for receiving an input optical beam and producing therefrom parallel forward-going first and second polarized optical beams offset in a first direction and having the matching linear polarization states;
    a birefringent filter apparatus for receiving the first and second polarized forward-going beams and for producing therefrom a first and second elliptically polarized optical beams, respectively, each including first and second beam components having complementary intensities which vary periodically, over a predefined free-spectral range, with the frequency of the input optical beam;
    a wrap-around apparatus for further separating in a second direction the first and second elliptically polarized beams to form four beams all with linear polarization states and for reversing the direction all four forward-going beams to four backward-going beams which transit again the birefringent filter apparatus and wherein
    the birefringent filter apparatus is large enough to accommodate both the forward-going beams and the backward-going beams and wherein the birefringent filter apparatus produces four elliptically polarized beams from the backward-going beams each including first and second beam components; and wherein
    the external-interface apparatus has a large enough clear aperture so as to accommodate the first and second polarized forward-going beams and the four elliptically polarized backward-going beams.

2. The double-pass birefringent filter of claim 1 wherein the external-interface apparatus includes
    a beam displacer for receiving the input optical beam and producing therefrom parallel forward-going first and second polarized optical beams offset in a first direction; and
    a $\lambda/2$ waveplate for changing the polarization of the first optical beam to be the same as the second optical beam.

3. The double-pass birefringent filter of claim 2 wherein the $\lambda/2$ waveplate is followed by a sheet polarizer.

4. The double-pass birefringent filter of claim 2 wherein the beam displacer is constructed using materials selected from a group including calcite and rutile, yttrium ortho-vanadate, alpha-barium borate, and lithium niobate.

5. The double-pass birefringent filter of claim 1 wherein the beam displacer is constructed using two triangular prisms attached to each other to form a rectangular shape.

6. The double-pass birefringent filter of claim 2 wherein a crystal cut of the beam displacer is different from a crystal cut of birefringent plates used in the birefringent filter apparatus.

7. The double-pass birefringent filter of claim 1 wherein the external-interface apparatus includes
    a rhombuus polarized beam splitter for receiving the input optical beam and producing therefrom parallel forward-going first and second polarized optical beams offset in a first direction; and
    a $\lambda/2$ waveplate for changing the polarization of the first optical beam to be the same as the second optical beam.

8. The double-pass birefringent filter of claim 1 wherein the linear birefringent filter is constructed of a series of several different birefringent waveplates using materials selected from a group including calcite, and rutile, yttrium ortho-vanadate, alpha-barium borate, and lithium niobate.

9. The double-pass birefringent filter of claim 1 wherein the wrap-around apparatus includes
    a beam displacer for separating in a second direction the first and second elliptically polarized beams to form four forward-going beams all with linear polarization states;
    a retro-reflector for reversing the direction the four forward-going beams to four backward-going beams.

10. The double-pass birefringent filter of claim 9 wherein a crystal cut of the beam displacer is different from a crystal cut of birefringent plates used in the birefringent filter apparatus.

11. The double-pass birefringent filter of claim 9 wherein the birefringent filter apparatus includes one or more birefringent waveplates designed so that the thickness of the plates controls the free-spectral range of the filter and the relative azimuth orientation of the one or more plate controls the shape of the filter intensity response.

12. The double-pass birefringent filter of claim 1 wherein the wrap-around apparatus includes
    a beam displacer for separating in a second direction the first and second elliptically polarized beams to form four beams all with linear polarization states;
    a retro-reflector prism for reversing the direction of the four forward-going beams to four backward-going beams.

13. The birefringent filter of claim 12 being a demultiplexer used to demultiplex an input wavelength division multiplexed (WDM) signal into a first of the two output beams including even wavelengths of the WDM signal and a second of the two output beams including odd wavelengths of the WDM signal.

14. The birefringent filter of claim 1 wherein the two output beams have intensities which vary as a periodic function of the frequency of the input light and the output beam intensities vary in a complimentary manner but so that their sum power remains invariant to the input frequency.

15. A method of operating a double-pass birefringent filter comprising the steps of:
    receiving an input optical beam at a first optical apparatus and producing therefrom parallel forward-going first and second polarized optical beams offset in a first direction and having the matching linear polarization states;

receiving the first and second polarized forward-going beams at a second optical apparatus and for producing therefrom a first and second elliptically polarized optical beams, respectively, each including first and second beam components having complementary intensities which vary periodically, over a predefined free-spectral range, with the frequency of the input optical beam;

further separating in a second direction the first and second elliptically polarized beams in a third optical apparatus to form four beams all with linear polarization states and for reversing the direction all four forward-going beams to four backward-going beams which transit again the second optical apparatus;

producing four elliptically polarized beams at the second optical apparatus the backward-going beams each including first and second beam components; and producing at the first optical apparatus, from the four elliptically polarized beams backward-going beams, six parallel output optical beams, two output beams of which include two complimentary orthogonal polarization components, and four output beams of which substantially include only one of the two complimentary orthogonal polarization components.

16. The method of claim 15 wherein the six parallel output beams are reduced to two by a sheet polarizer placed just before said second optical apparatus.

* * * * *